United States Patent
Rajendran et al.

(10) Patent No.: US 8,896,610 B2
(45) Date of Patent: Nov. 25, 2014

(54) ERROR RECOVERY OPERATIONS FOR A HARDWARE ACCELERATOR

(75) Inventors: Resmi Rajendran, Bangalore (IN); Pavan Venkata Shastry, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 337 days.

(21) Appl. No.: 13/399,372

(22) Filed: Feb. 17, 2012

(65) Prior Publication Data
US 2013/0044118 A1   Feb. 21, 2013

Related U.S. Application Data

(60) Provisional application No. 61/444,397, filed on Feb. 18, 2011.

(51) Int. Cl.
*G06T 1/20* (2006.01)
(52) U.S. Cl.
CPC .................................... *G06T 1/20* (2013.01)
USPC .......................................... 345/506; 345/519
(58) Field of Classification Search
None
See application file for complete search history.

(56) References Cited

U.S. PATENT DOCUMENTS

| 4,982,402 A * | 1/1991 | Beaven et al. ................ 714/15 |
|---|---|---|
| 6,954,845 B2 * | 10/2005 | Arnold et al. .................. 712/36 |
| 7,027,515 B2 * | 4/2006 | Lin ......................... 375/240.25 |
| 7,912,302 B2 * | 3/2011 | Stein et al. ................... 382/234 |
| 2003/0156652 A1 * | 8/2003 | Wise et al. ............... 375/240.26 |
| 2005/0123057 A1 * | 6/2005 | MacInnis et al. ........ 375/240.25 |
| 2006/0078003 A1 * | 4/2006 | Watanabe et al. ............ 370/503 |
| 2008/0126743 A1 * | 5/2008 | Jusufovic ......................... 712/1 |
| 2010/0171762 A1 * | 7/2010 | MacInnis et al. ............. 345/660 |
| 2010/0177585 A1 * | 7/2010 | Rubinstein et al. ...... 365/230.05 |
| 2010/0246683 A1 * | 9/2010 | Webb et al. .............. 375/240.16 |

\* cited by examiner

*Primary Examiner* — Ulka Chauhan
*Assistant Examiner* — Patrick F Valdez
(74) *Attorney, Agent, or Firm* — Robert D. Marshall, Jr.; Frederick J. Telecky, Jr.

(57) ABSTRACT

In at least some embodiments, an apparatus includes a hardware accelerator subsystem with a pipeline. The hardware accelerator subsystem is configured to perform error recovery operations in response to a bit stream error. The error recovery operations comprise a pipe-down process to completely decode a data block that is already in the pipeline, an overwrite process to overwrite commands in the hardware accelerator subsystem with null operations (NOPs) once the pipe-down process is complete, and a pipe-up process to restart decoding operations of the pipeline at a next synchronization point.

17 Claims, 7 Drawing Sheets

PIPE-DOWN OPERATIONS

1. INSIDE THE ERROR ASYNC TASK (ASSUME THAT ERROR OCCURS FOR MB #N):
   - SET A SW FLAG INDICATING ERROR HAS OCCURRED
   - DO NOT SEND EndOfTask (EOT)
   SINCE THE EOT FOR THE ASYNC TASK IS NOT SENT, ECD3 STALLS. THUS A PIPE-DOWN IS INITIATED
2. WAIT UNTIL N-1 MBs COME OUT OF THE PIPELINE (USING NewTask COUNTER OF LAST TASK IN THE PIPELINE, OR ACTIVATION COUNTER OF ITS PREDECESSOR)
3. WAIT UNTIL ECD3 LOAD RECEIVES N+2 ACTIVATIONS (USING ACTIVATION COUNTER OF ECD3 LOAD). EOT HAS STILL NOT BEEN SENT FOR THE ERROR ASYNC TASK, AND ECD3 IS STILL WAITING TO COMPLETE (LOAD #(N+1) AND COMP N). SINCE THERE ARE ONLY TWO BUFFERS BETWEEN ECD3 LOAD AND ITS PREDECESSOR iCONT TASK, THAT iCONT TASK ALSO WILL NOT GO AHEAD AFTER N+2
4. CHANGE AMR OF THIS PREDECESSOR TASK (ADD INVALID ACTIVATOR) iCONT2 T0 SO THAT IT WON'T OCCUR AGAIN FOR N+3 AND MORE
5. CHANGE THE AMR OF THE SUCCESSOR TASK OF ECD3 STORE (iCONT1 T1) SO THAT N, N+1 AND N+2 DO NOT ENTER THE PIPELINE BEYOND ECD3 STORE

OVERWRITE OPERATIONS

1. SET THE SOFTWARE FLAG IN SL2 = 1, SO THAT NEXT ECD3 LOAD WILL LOAD THE NOP + END COMMANDS IN ECD AUXILIARY BUFFER PONG AND ECD3 WILL NOT DO ANY ACTUAL COMPUTATION FOR N+2
2. CHANGE ECD3 COMP COMMANDS IN PING TO NOP + END SO THAT ECD3 WILL NOT DO ANY ACTUAL COMPUTATION FOR N+1
3. SEND EOT FOR THE ASYNC TASK
4. THIS WILL ALLOW ECD3 LOAD, COMP AND STORE FOR N, N+1 AND N+2 TO COMPLETE. BUT THESE WON'T GO BEYOND STORE FOR N+2 DUE TO STEP 5 OF THE PIPE-DOWN OPERATIONS
5. WAIT TILL STORE N+2 IS COMPLETE (USING ACT COUNTER OF THE SUCCESSOR TASK)

AT THIS POINT, NO MORE MBs ARE REMAINING IN THE PIPELINE. DO THE RESTART PROCESS (RE-PROGRAMMING, PIPE-UP) HERE

PIPE-UP OPERATIONS

RESUMING FROM THE NEXT RESYNCHRONIZATION POINT IS DONE AS FOLLOWS:

1. DO A START CODE SEARCH AND FIND THE NEXT RESYNCHRONIZATION POINT (SLICE FOR H.264) IN THE PIPELINE. IF THIS IS IN THE SAME FRAME, DO THE FOLLOWING STEPS. ELSE RETURN FROM THE PROCESS CALL
2. DECODE THE SLICE HEADER
3. UPDATE ALL SOFTWARE COUNTERS TO POINT TO THE NEW MB NUMBER
4. DO ClearStatus OF ALL SYNCBOXES
5. UPDATE ECD3 REGISTERS SO THAT ECD3 WILL RESUME DECODING FROM THE NEW SLICE
6. UPDATE ALL LSE COUNTERS IN SL2
7. MAKE iLF3 POINT TO THE CORRECT MBCT IN SL2 - FOR THIS, CHANGE THE ILF_CONFIG REGISTER SO THAT iLF3 DOES NOT DO ANY ACTUAL PROCESSING AND SEND AS MANY FAKE MESSAGES AS REQUIRED TO POINT TO THE CORRECT MBCT
8. UPDATE THE vDMA DESCRIPTORS
9. CORRECT THE AMRs OF iCONT2 T0 AND iCONT1 T1 WHICH WE HAD CHANGED FOR PIPE-DOWN
10. SEND THE FAKE MESSAGES SO THAT PIPE-UP WILL HAPPEN

ERROR RECOVERY OPERATIONS FOR A HARDWARE ACCELERATOR

CROSS-REFERENCE TO RELATED APPLICATION

The present application claims priority to U.S. Provisional Patent Application No. 61/444,397, filed on Feb. 18, 2011; which is hereby incorporated herein by reference.

BACKGROUND

Hardware accelerators (HWA) are designed to perform particular functions faster than is possible with software and general-purpose processor. For example, HWAs have been used to perform mathematical operations and/or graphics operations for computing devices. For mobile computing devices, efficient operations performed by HWAs can improve battery-life and performance. There is some overhead associated with use of HWAs with other system components. Further, error recovery for HWAs can be a challenging task. In particular, as automation of tasks for a HWA architecture increases, the difficulty of error recovery likewise increases. HWA architectural complications exist, for example, due to distributed synchronization and timing differences of HWA components.

SUMMARY

The problems noted above are solved in large part by an apparatus comprising a hardware accelerator subsystem with a pipeline. The hardware accelerator subsystem is configured to perform error recovery operations in response to a bit stream error. The error recovery operations comprise a pipe-down process to completely decode a data block that is already in the pipeline, an overwrite process to overwrite commands in the hardware accelerator subsystem with null operations (NOPs) once the pipe-down process is complete, and a pipe-up process to restart decoding operations of the pipeline at a next synchronization point.

Further, in at least some embodiments, a semiconductor chip comprises a hardware accelerator subsystem having a video encoder/decoder component with a pipeline and with error recovery logic. The error recovery logic is configured to perform pipe-down operations to clear the pipeline without interrupting ongoing tasks, to stall end of task signaling, to wait for a predetermined number of data blocks to come out of the pipeline and for a predetermined number of load activations for the video encoder/decoder component, and to load null operations (NOPs) to the video encoder/decoder component. The error recovery logic is also configured to release the end of task signaling, and to perform pipe-up operations to restart the pipeline at a next synchronization point.

Further, in at least some embodiments, a method for error recovery in a hardware accelerator subsystem with a video decoding pipeline comprises performing a pipe-down process to completely decode a data block that is already in the video decoding pipeline. The method also comprises performing an overwrite process to overwrite commands in the hardware accelerator subsystem with null operations (NOPs) once the pipe-down process is complete. The method also comprises performing a pipe-up process to restart operations of the video decoding pipeline after a predetermined store operation associated with a final stage of the pipeline is complete.

BRIEF DESCRIPTION OF THE DRAWINGS

For a more complete understanding of the present disclosure, reference is now made to the accompanying drawings and detailed description, wherein like reference numerals represent like parts:

FIG. 6 illustrates pipe-down operations for a HWA component in accordance with various embodiments;

FIG. 7 illustrates overwrite operations for a HWA component in accordance with various embodiments;

FIG. 8 illustrates pipe-up operations for a HWA component in accordance with various embodiments;

NOTATION AND NOMENCLATURE

Figure 1:
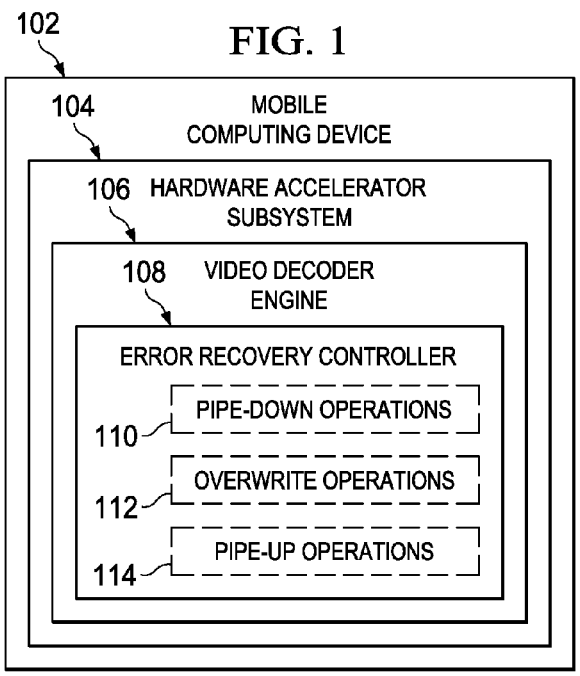
FIG. 1 illustrates a mobile computing device in accordance with various embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are methods and systems for error recovery in a hardware accelerator (HWA) subsystem. The HWA subsystem may correspond to, for example, a video encoder/decoder engine. More particularly, the disclosed error recovery operations were developed for an image video audio (IVA) subsystem of an Open Multimedia Application Platform (OMAP) processor. However, embodiments are not limited to any particular processor or device. Rather, the disclosed error recovery operations may be implemented for any HWA subsystem with a pipeline and control components as described herein. The disclosed error recovery operations comprise a pipe-down process, an overwrite process, and a pipe-up process to ensure that, when a bit stream error occurs, all HWA components are brought to a clean state and decoding is resumed correctly from the next synchronization point. More specifically, the pipe-down process enables a data block that is already in the pipeline to be completely decoded. The overwrite process is used to overwrite commands in relevant HWA components with null operations (NOPs) once the pipe-down process is complete. Finally, the pipe-up process restarts decoding operations of the pipeline at a next synchronization point. For video decoding, if the next sync point is in the next picture frame, the process call should be ended gracefully and the error should be conveyed to the application. If the next sync point is a slice in the same picture, a match should be ensured from that slice onward.

FIG. 1 illustrates a mobile computing device 100 in accordance with various embodiments. The mobile computing device 100 may correspond to, for example, a cellular phone, a smart phone, a personal digital assistant (PDA), a tablet computer, a laptop computer, a video surveillance device, a video recording device, a video conferencing device, or other portable computing devices which may at times rely on battery power. It should be understood that although the disclosed HWA subsystem and error recovery operations are described for the mobile computing device 100, embodiments are not limited to any particular computing device.

As shown, the mobile computing device 100 comprises a HWA subsystem 104. For example, the HWA subsystem 104 may be an AVI engine. In at least some embodiments, the HWA subsystem 104 comprises a video decoder engine 106. In some embodiments, the video decoder engine 106 may be part of an entropy encoder/decoder engine. The HWA subsystem 104 may additionally or alternatively comprise other components for efficiently encoding/decoding audio streams and/or video streams. The video decoder engine 106 comprises an error recovery controller 108 to control error recovery operations such as pipe-down operations 110, overwrite operations 112, and pipe-up operations 114. The error recovery controller 108 may be triggered, for example, in response to an asynchronous error such as a bit stream error.

With the pipe-down operations 110, the error recovery controller 108 completely decodes any data blocks (e.g., macroblocks) that are already in the pipeline. During the pipe-down operations 110, the video decoder engine 106 stalls end of task signaling and continues pipeline operations for all data blocks for which activations are received while the end of task signaling is stalled.

With the overwrite operations 112, the error recovery controller 108 overwrites commands in the video decoder 106 with null operations (NOPs) once the pipe-down operations 110 are complete. In some embodiments, the commands may be stored in a memory internal to the video decoder engine 106. During the overwrite operations 112, ping state commands of the video decoder engine 106 are directly overwritten with NOPs by a sequencer component. Also, pong state commands of the video decoder engine are overwritten by a load/store engine that loads the NOPs to an auxiliary buffer of the video decoder engine 106. As used herein, the ping/pong state refers to toggling between two separate buffer instances by a hardware accelerator component (e.g., the video decoder engine 106). While a hardware accelerator works with one instance of buffer, the load/store engine is associated with the other buffer and vice versa. In some embodiments, the video decoder engine 106 comprises a shared memory that stores a flag to initiate loading of NOPs after the pipe-down process is complete. The shared memory may be separate from an internal memory of the video decoder engine 106 that stores the commands to be overwritten.

With the pipe-up operations 114, the error recovery controller 108 restarts decoding operations of the pipeline at a next synchronization point. The pipe-up operations 114 ensure that the video decoder engine 106 is able to start from a next synchronization point with all syncboxes, registers, counters, descriptors being updated appropriately.

Figure 2:
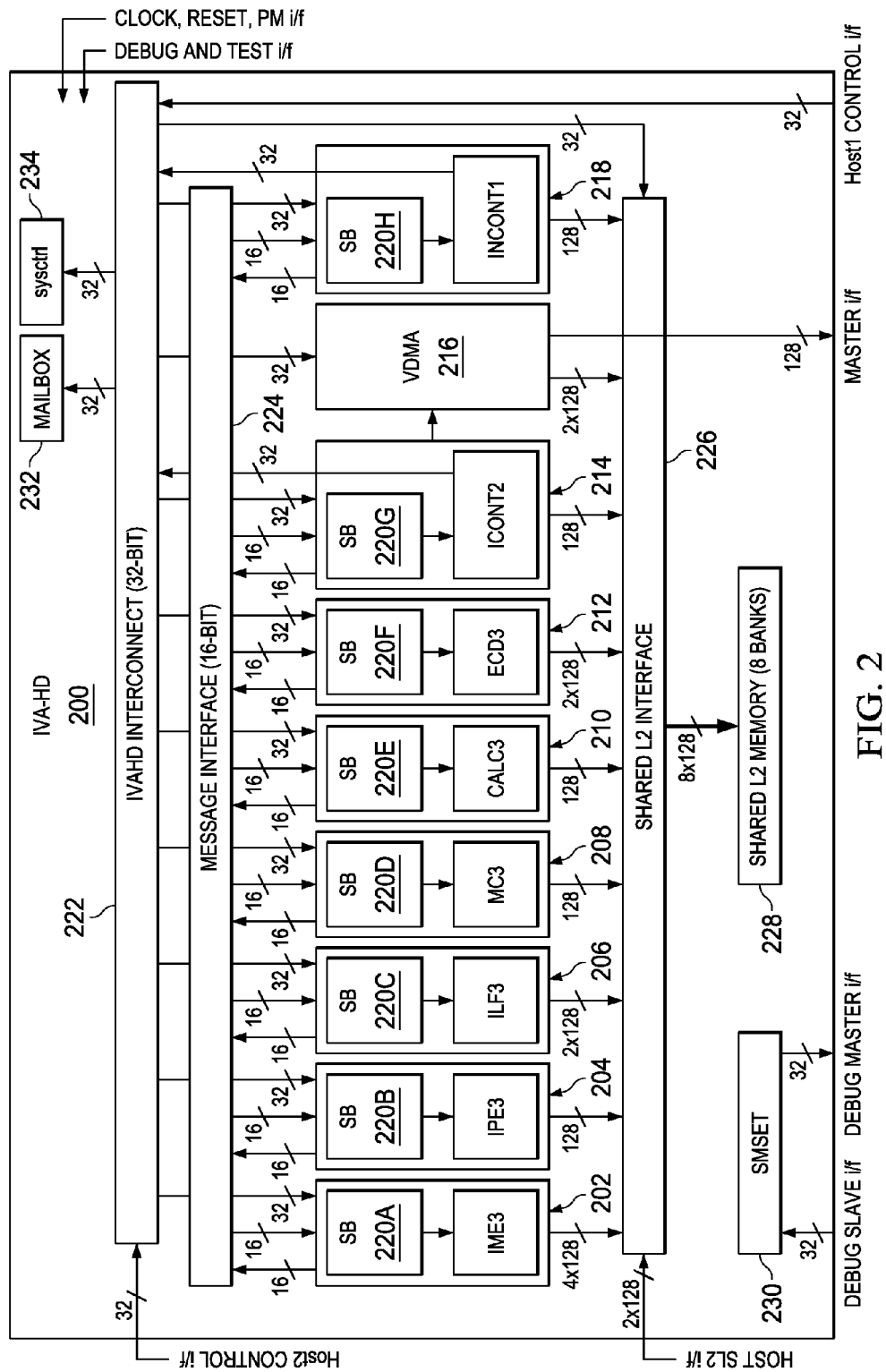
FIG. 2 illustrates a hardware accelerator (HWA) subsystem architecture in accordance with various embodiments.

FIG. 2 illustrates a HWA subsystem architecture 200 for the mobile communication device of FIG. 1 in accordance with various embodiments. The HWA subsystem architecture 200 may be implemented on a semiconductor chip configured to perform the error recovery operations disclosed herein. The HWA subsystem architecture 200 corresponds to a high-definition image, video, audio (IVA-HD) HWA engine. As shown, the HWA subsystem architecture 200 comprises various HWA components including, an improved motion estimation acceleration engine (iME3) 202, an intraprediction estimation engine (IPE3) 204, an improved loop filter acceleration engine (iLF3) 206, a motion compensation engine (MP3) 208, a calculation engine (CALC3) 210, an entropy coder/decoder engine (ECD3) 212, a primary sequencer (iCONT1) 218, a secondary sequencer (iCONT2) 214, and a video direct memory access (VDMA) engine 216. As shown, each HWA component of the HWA subsystem architecture 200 has a corresponding syncbox (SB) 220A-220H to coordinate the message flow and scheduling. Further, ECD3 212, CALC3 210, and MC3 208 comprise a Load Store Engine (LSE) and a core. Each LSE is used for data transfers between the Shared L2 (SL2) memory and the HWA internal buffers. Each LSE also initiates a core compute cycle, where each core does the actual data processing and computing. In the HWA subsystem architecture 200, iLF3 206 does not have an LSE and directly accesses data from a shared L2 (SL2) memory 228 accessible to the HWA components via a SL2 interface 226. The HWA components are also able to communicate with each other and/or with an IVAHD interconnect 222 via a messaging interface 224.

As shown, the IVAHD interconnect 222 couples to host control interfaces (host1 control i/f and host 2 control i/f). A mailbox feature 232 and a system control (sysctrl) feature 234 also couple to the IVAHD interconnect 222. The HWA subsystem architecture 200 also comprises a debug interface (SMSET) 230 coupled to a master debug interface (debug master i/f) and to a slave debug interface (debug slave i/f). In accordance with at least some embodiments, the HWA subsystem architecture 200 corresponds to the HWA subsystem 104 of FIG. 1. Meanwhile, ECD3 212 may correspond to the video decoder engine 106 of FIG. 1.

Figure 3:
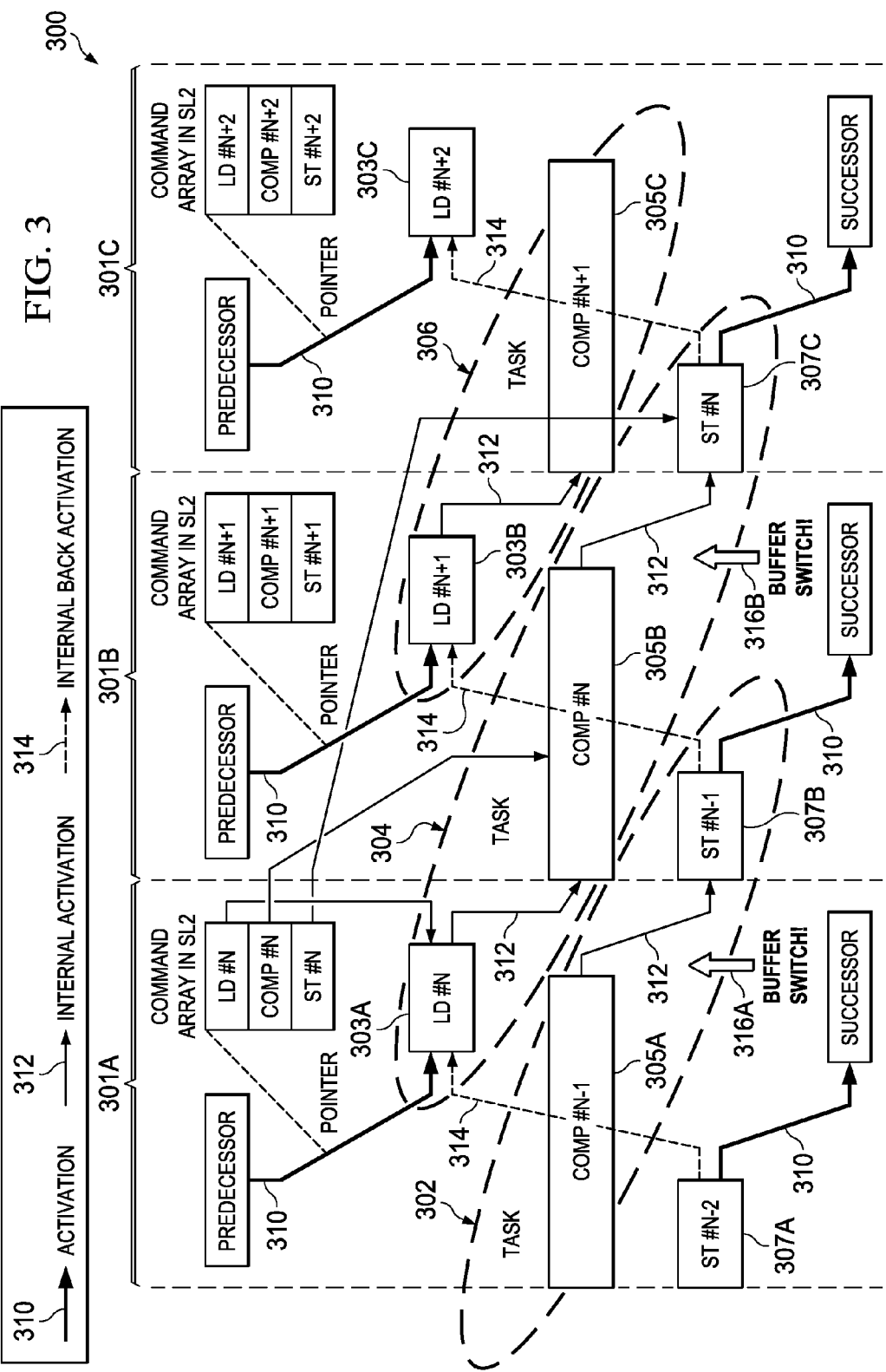
FIG. 3 illustrates a pipelined data transfer mechanism for a HWA component in accordance with various embodiments.

FIG. 3 illustrates a pipelined data transfer mechanism 300 for a HWA component in accordance with various embodiments. As shown, the pipelined data transfer mechanism 300 shows a plurality of tasks 302, 304, and 306 spread across a plurality of pipeline stages 301A-301C, where each task 302, 304, 306 comprises a load operation, a compute operation, and a store operation. More specifically, pipeline stage 301A shows a store operation 307A for data block #N+2, a compute operation 305A associated with task 302 (data block #N−1), and a load operation 303A associated with task 304 (data block #N). During the pipeline stage 301A, the command array in SL2 is a load operation, a compute operation, and a store operation for data block #N. Meanwhile, pipeline stage 301B shows a store operation 307B associated with task 302 (data block #N−1), a compute operation 305B associated with task 304 (data block #N), and a load operation 303B associated with task 306 (data block #N+1). During the pipeline stage 301B, the command array in SL2 is a load operation, a compute operation, and a store operation for data block #N+1. Finally, pipeline stage 301C shows a store operation 307C associated with task 304 (data block #N), a compute operation 305C associated with task 306 (data block #N−1), and a load operation 303C associated with data block #N+2. During the pipeline stage 301C, the command array in SL2 is a load operation, a compute operation, and a store operation for data block #N+2.

In the pipelined data transfer mechanism 300, a predecessor task for each pipeline stage 301A-301C may activate (shown by arrows 310) the load operations 303A-303C. Further, the store operations 307A-3070 for each pipeline stage 301A-301C may activate (shown by arrows 310) a successor task. Further, each compute operation 305A-305C is activated internally (shown by arrows 312) by a corresponding load operation of the same task. Also, each store operations 307A-70C is activated internally (shown by arrows 312) by a corresponding compute operation of the same task. In accordance with at least some embodiments, a buffer switch 316A and 316B occurs during internal activation operations. In the pipelined data transfer mechanism 300, each load operation 303A-303C is initiated by an internal back activation (shown by arrows 314) that follows a store operation in the same pipeline stage.

In at least some embodiments, the pipelined data transfer mechanism 300 is performed by an LSE. To summarize, the pipelined data transfer mechanism 300 shows that triggering of a load operation is automatically done by the completion of the previous store operation. Further, triggering of each compute operation is done by the completion of the corresponding load operation. This happens as a state machine without any external control for the compute trigger. Load and store triggers also may be controlled by the completion of the preceding and succeeding tasks.

Figure 4:
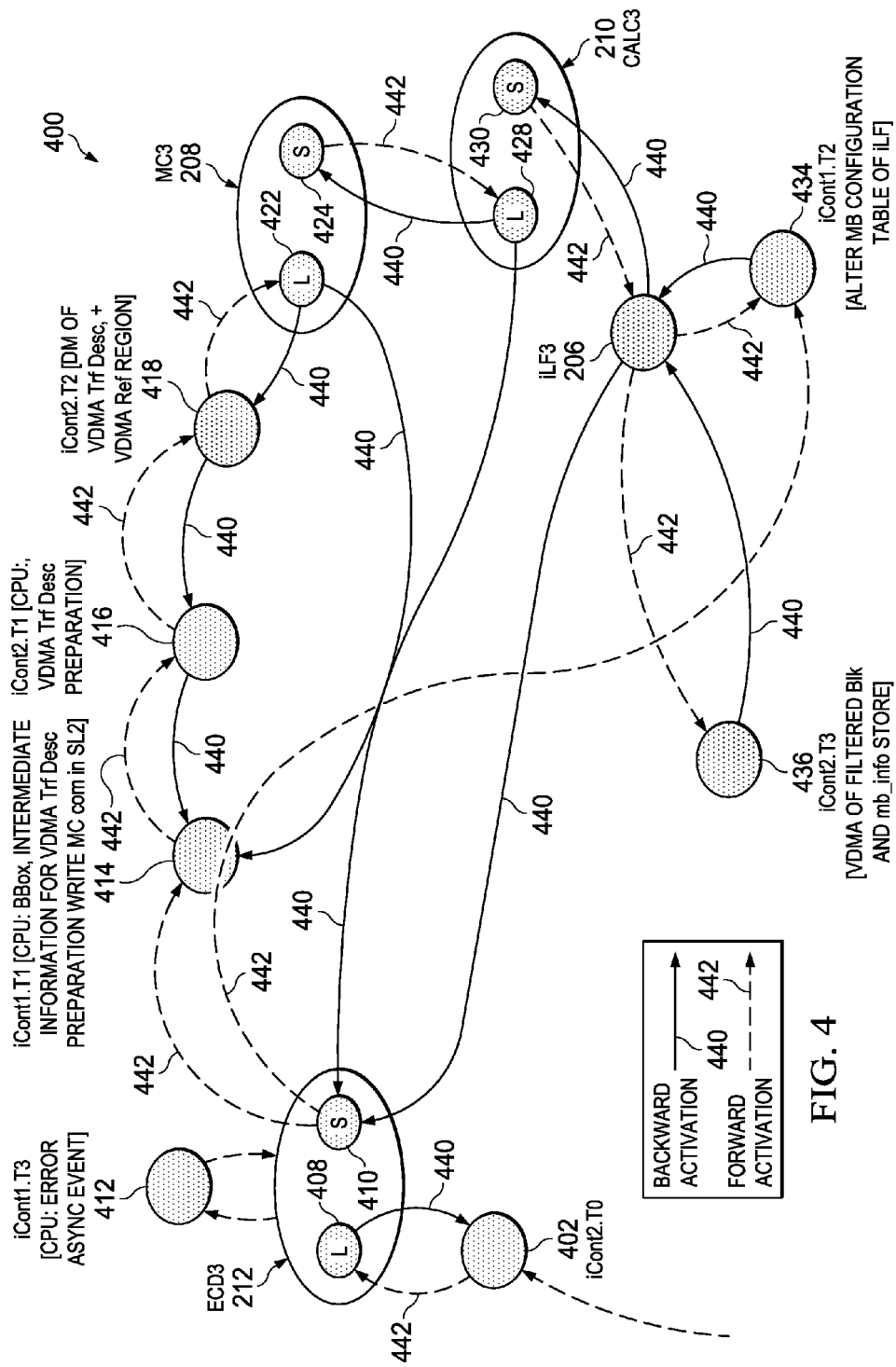
FIG. 4 illustrates a syncbox message flow diagram for a HWA component in accordance with various embodiments.

FIG. 4 illustrates a syncbox message flow diagram 400 for a HWA decoder in accordance with various embodiments. In the syncbox message flow diagram 400, various HWA components and various tasks are represented as being backward activated (represented by arrows 440) and/or forward activated (represented by arrows 442) by other HWA components or tasks. More specifically, task 402 (iCont2.T0) forward activates or is backward activated by a load operation 408 of ECD3 212. Similarly, the load operation 408 of ECD3 212 is forward activated by or backward activates task 402. From ECD3 212, an error may result in task 412 (iCont1.T3 or error async task), which causes the pipe-down operations, overwrite operations, and pipe-up operations described herein.

The store operation 410 of ECD3 212 forward activates task 414 (iCont.T1) and/or task 434 (iCont1.T2). The store operation 410 of ECD3 212 also may be backward activated by a load operation 428 of CALC3 210 or by iLF3 206. As shown, the task 414 may be forward activated by a store operation 410 of ECD3 212. The task 414 also may forward activate task 416 (iCont2.T1) or may be backward activated by task 416 or by a load operation 422 of MC3 208. Similarly, the task 416 is forward activated by task 414 or backward activates task 414. In addition, task 416 forward activates task 418 (iCont2.T2) or may be backward activated by task 418. The task 418 is forward activated by task 416 or backward activates task 416. In addition, the task 418 forward activates a load operation 422 of MC3 208 or is backward activated by a load operation 422 of MC3 208. The load operation 422 of MC3 208 is forward activated by task 418 or backward activates task 418. In addition, the load operation 422 of MC3 208 backward activates task 414.

As shown, a store operation 424 of MC3 208 forward activates a load operation 428 of CALC3 210 or is backward activated by a load operation of CALC3 210. Similarly, a load operation of CALC3 210 backward activates a store operation 424 of MC3 208 or is forward activated by a store operation 424 of MC3 208. A store operation 430 of CALC3 210 forward activates iLF3 206 or is backward activated by iLF3 206. As shown, iLF3 208 may be backward activated by a task 436 (iCont2.T3) or by task 434. Meanwhile, iLF3 208 backward activates a store operation 430 of CALC3 210 or a store operation 410 of ECD3 212. The iLF3 208 also may forward activate task 434 or task 436. In general, the flow diagram 400 shows various dependencies between different HWA components of HWA subsystem architecture 200.

Error Recovery for the IVA-HD subsystem architecture 200 is challenging due to the complex architecture and the distributed synchronization mechanism used. Further, control flow is fully automated with minimal/no software intervention at MB level. Further, SB and LSE engines are implemented based on state machines. Hence, they are very sensitive to timing and programming/control flow is involved. The disclosed error recovery operations achieve pipe-down on error and ensure a clean state of all HWA components, even if the HWA components are busy processing their current tasks. For resuming the pipeline from the next data slice, appropriate re-programming of several hardware counters and registers is also needed.

Figure 5:
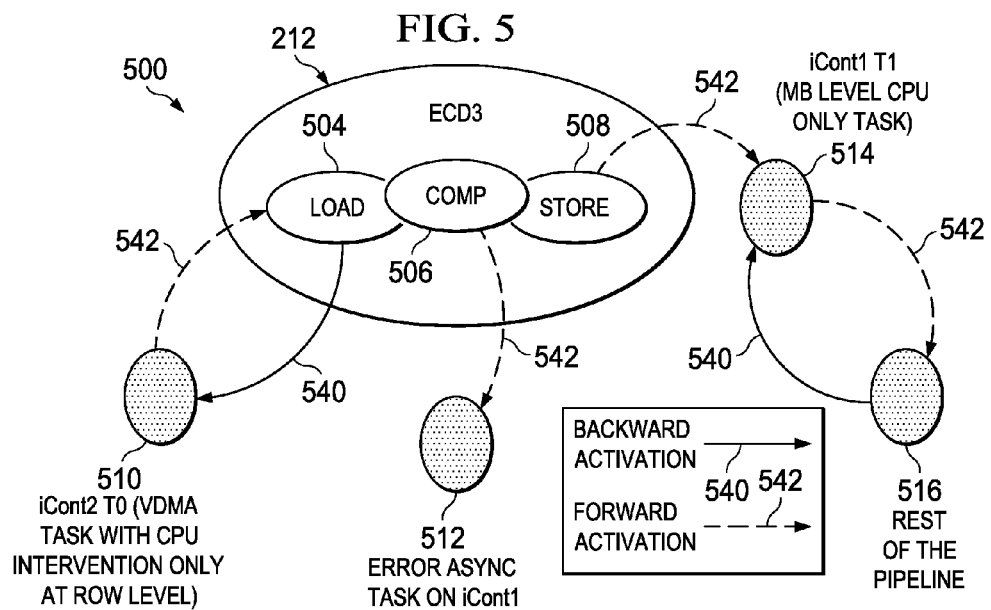
FIG. 5 illustrates a control flow for handling a bit stream error by a HWA component in accordance with various embodiments.

FIG. 5 illustrates a control flow 500 for handling a bit stream error by a HWA component in accordance with various embodiments. In control flow 500, various operations of the ECD3 212 are represented as being backward activated (represented by arrows 540) and/or forward activated (represented by arrows 542) by other tasks. More specifically, a load operation 504 of ECD3 212 backward activates task 510 (iCont2.T0) or is forward activated by task 510. Further, a compute operation 506 of ECD3 212 forward activates task 512, corresponding to an error async task that results in the pipe-down operations, overwrite operations, and pipe-up operations described herein. Further, a store operation 508 of ECD3 212 forward activates task 514 (iCont1.T1). As shown in the control flow 500, the task 514 forward activates task 516 or is backward activated by task 516, which represents the rest of the pipeline.

For a bit stream error, ECD3 212 detects the error and raises an asynchronous event. In some embodiments, a core of ECD3 212 decodes the erroneous macroblock and raises the error async event. Then, iCONT receives an interrupt and does the error servicing. Meanwhile, the core of ECD3 212 is in a busy state waiting for an EndOfTask (EOT) signal from the error task of iCONT. ECD3 212 doesn't decode the next macroblock (MB) until it receives this EOT. When ECD3 212 receives the EOT, it will go ahead and decode the next MB. The LSE of ECD3 212 will be doing the scheduled LOAD and STORE tasks independent of the error detected by the core.

When iCONT receives the error interrupt from ECD3 212 for MB #N, all other HWAs will be busy processing their respective tasks for previous MBs in the pipeline. The disclosed error recovery operations initiate a pipe-down to allow all the HWAs to complete their ongoing tasks. Further, disclosed error recovery operations enable all HWAs to be in a "clean" state after the pipe-down, with no internal signals pending. Otherwise, internal signals in HWA components may be pending, resulting in undefined behavior results (typically observed as hang) when decoding is resumed from the next slice/picture. The disclosed error recovery operations also prevent all the HWAs from going ahead for the subsequent MBs.

In some embodiments, there are two buffers between a task (e.g., iCONT2.T0) and a load operation of ECD3 212. In such case, the task will be running a maximum 2 macroblocks ahead of ECD3 LOAD (load operation). When the error async event reaches iCONT, the task might not be completed until MB #N+2 whereas ECD3 LOAD might be completed at MB #N−1. Complete certainty of the exact timings of these tasks is difficult. Accordingly, when an async EOT is sent, ECD3 212 will immediately complete COMP (compute operation) #N and start COMP #N−1, but additional COMPs by ECD3 core are avoided, since this may cause issues such as ECD3 registers becoming corrupted, raising an additional error async event, or raising a stream buffer fill async event that corrupts the bit stream buffer in SL2. Due to the limited instruction tightly coupled memory (ITCM) size for the IVA-HD subsystem, the error recovery code should be having as minimum size as possible.

In at least some embodiments, the disclosed error recovery operations enable all HWA components to finish their tasks normally without the use of HWA Reset, Token_Clr, nor DEBUG_HALT to clear any HWA status. As disclosed herein, a pipe-down is initiated at error so that the previous MB is decoded completely. Once pipe-down is achieved, the ECD3 commands in ECD3 internal memory are overwritten with NOPs. Then ECD3 212 is allowed to continue for all MBs for which activations are received. The ECD3 commands in ping (view on which COM #N−1 will happen) are directly overwritten with NOP, since iCONT will be the master at this time. Updates of ECD3 commands in pong (view on which COMP #N+2 will happen) is accomplished by LSE loading these commands to the ECD3 Auxiliary Buffer. For example, this may be done by using the Apdtv_add( ) command of LSE. A flag in SL2 is maintained to enable the LOAD of ECD3 NOP commands, and make the LOAD a conditional LOAD using the AdptvFlagAddr( ) command. The conditional flag is set to "1" after the pipe-down on error.

FIG. 6 illustrates pipe-down operations 110 for a HWA component in accordance with various embodiments. The pipe-down operations 110 begin in response to an error async task being raised and assume that error occurs for MB #N. As shown, a flag is set to indicate that an error has occurred and EndOfTask (EOT) signaling is stalled. Since the EOT for the async task is not sent, ECD3 212 stalls and a pipe-down is initiated. During the pipe-down, N−1 MBs come out of the pipeline (using NewTask Counter of last task in the pipeline, or Activation Counter of its predecessor). Also, ECD3 LOAD receives N+2 activations (using Activation Counter of ECD3 LOAD). Since EOT signaling for the error async task has not been sent, ECD3 212 is still waiting to complete (LOAD #(N−1) & COMP N). Since there are only 2 buffers between ECD3 LOAD and its predecessor iCONT task, that iCONT task also will not go ahead after N+2. During the pipe-down, the address mapped registers (AMR) of this predecessor task (iCONT2.T0) is changed (e.g., an invalid activator is added) so that it won't occur again for N+3 or more. Also, the AMR of the successor task (iCONT1.T1) of ECD3 STORE is changed so that MB #N, MB #N−1 and MB #N+2 do not enter the pipeline beyond ECD3 STORE (store operation).

FIG. 7 illustrates overwrite operations 112 for a HWA component in accordance with various embodiments. To initiate the overwrite operations, the software flag in SL2 is set to "1", so that next ECD3 LOAD will load the NOP+END commands in ECD aux buffer PONG and ECD3 212 will not do any actual computation for N+2. Further, ECD3 COMP commands are changed in PING to NOP+END so that ECD3 will not do any computation for MB #N+1. At this point, EOT signaling for the async task is allowed to proceed, which enables ECD3 LOAD, COMP and STORE for MB #N, MB #N+1 and MB #N+2 to complete. However, no operations beyond ECD3 STORE for MB #N+2 will occur due to the AMR changes during the pipe-down. After ECD3 STORE for MB #N+2 is complete (e.g., using ACT COUNTER of the successor task), no more MBs are remaining in the pipeline and the pipe-up operations can begin.

FIG. 8 illustrates pipe-up operations 114 for a HWA component in accordance with various embodiments. The pipe-up operations 114 enable pipeline operations to resume from the next resynchronization point. In at least some embodiments, the pipe-up operations 114 include searching code to find the next resynchronization point (e.g., a slice for H.264) in the pipeline. If this is in the same frame, the following steps are performed. Otherwise, the pipe-up process can be terminated in preparation of the next frame. For the pipe-up operations 114, the slice header is decoded and all software counters are updated to point to the new MB number. Further, a ClearStatus of all syncboxes is performed. Further, ECD3 registers are updated so that ECD3 212 will resume decoding from the new slice. Further, all LSE counters in SL2 are updated. Further, iLF3 206 is made to point to the correct macroblock count (MBCT) in SL2. For this step, the ILF_CONFIG register is changed so that iLF3 does not do any processing. In some embodiments, fake messages may be sent to ensure iLF3 206 points to the correct MBCT. Further, the vDMA descriptors are updated. Also, the AMRs of iCONT2.T0 and iCONT1.T1 (which were changed during the pipe-down) are corrected. Fake messages are sent as needed so that the pipe-up will happen.

In FIGS. 6-8, the pipe-down operations 110, the overwrite operations 112, and the pipe-up operations 114 are shown in a particular order. However, it should be understood that some of the steps may be performed in a different order. Further, some of the steps may be performed in parallel.

Figure 9:
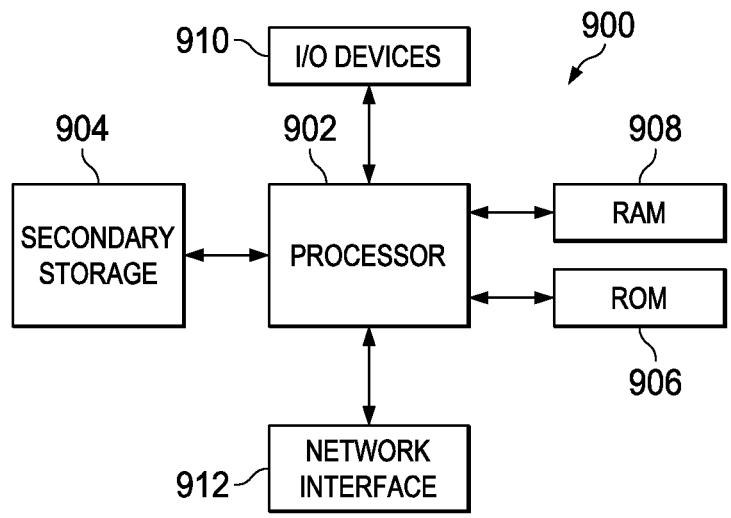
FIG. 9 illustrates a computer system in accordance with various embodiments.

The error recovery operations described herein may be implemented on a particular machine with sufficient processing power, memory resources, and network throughput capability to handle the necessary workload placed upon it. FIG. 9 illustrates a particular computer system 900 suitable for implementing one or more embodiments disclosed herein. The computer system 900 includes one or more processors 902 (which may be referred to as a central processor unit or CPU) in communication with a machine-readable medium. The machine-readable medium may comprise memory devices including secondary storage 904, read only memory (ROM) 906, and random access memory (RAM) 908. The processor 902 is further in communication with input/output (I/O) devices 910 and a network interface 912. The processor 902 may be implemented as one or more CPU chips.

It is understood that by programming and/or loading executable instructions onto the computer system 900, at least one of the processor 902, the RAM 908, and the ROM 906 are changed, transforming the computer system 900 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 904 is typically comprised of one or more disk drives or tape drives and is used for non-volatile storage of data and as an over-flow data storage device if RAM 908 is not large enough to hold all working data. Secondary storage 904 may be used to store programs which are loaded into RAM 908 when such programs are selected for execution. The ROM 906 is used to store instructions and perhaps data which are read during program execution. ROM 906 is a non-volatile memory device which typically has a small memory capacity relative to the larger memory capacity of secondary storage 904. The RAM 908 is used to store volatile data and perhaps to store instructions. Access to both ROM 906 and RAM 908 is typically faster than to secondary storage 904. The secondary storage 904, the RAM 908, and/or the ROM 906 may be referred to in some contexts as computer readable storage media and/or non-transitory computer readable media.

I/O devices 910 may include printers, video monitors, liquid crystal displays (LCDs), touch screen displays, keyboards, keypads, switches, dials, mice, track balls, voice recognizers, card readers, paper tape readers, or other well-known input devices.

The network interface 912 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network interfaces may enable the processor 902 to communicate with the Internet or one or more intranets. With such a network connection, it is contemplated that the processor 902 might receive information from the network, or might output information to the network in the course of performing the above-described method steps. Such information, which is often represented as a sequence of instructions to be executed using processor 902, may be received from and outputted to the network, for example, in the form of a computer data signal embodied in a carrier wave.

Such information, which may include data or instructions to be executed using processor 902 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 902 executes instructions, codes, computer programs, scripts which it accesses from hard disk, floppy disk, optical disk (these various disk based systems may all be considered secondary storage 904), ROM 906, RAM 908, or the network interface 912. While only one processor 902 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 904, for example, hard drives, floppy disks, optical disks, and/or other device, the ROM 906, and/or the RAM 908 may be referred to in some contexts as non-transitory instructions and/or non-transitory information.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 900, at least portions of the contents of the computer program product to the secondary storage 904, to the ROM 906, to the RAM 908, and/or to other non-volatile memory and volatile memory of the computer system 900. The processor 902 may process the executable instructions and/or data structures in part by directly accessing the computer program product, for example by reading from a CD-ROM disk inserted into a disk drive peripheral of the computer system 900. Alternatively, the processor 902 may process the executable instructions and/or data structures by remotely accessing the computer program product, for example by downloading the executable instructions and/or data structures from a remote server through the network interface 912. The computer program product may comprise instructions that promote the loading and/or copying of data, data structures, files, and/or executable instructions to the secondary storage 904, to the ROM 906, to the RAM 908, and/or to other non-volatile memory and volatile memory of the computer system 900.

As previously noted, the secondary storage 904, the ROM 906, and the RAM 908 may be referred to as a non-transitory computer readable medium or a computer readable storage media. A dynamic RAM embodiment of the RAM 908, likewise, may be referred to as a non-transitory computer readable medium in that while the dynamic RAM receives electrical power and is operated in accordance with its design, for example during a period of time during which the computer 900 is turned on and operational, the dynamic RAM stores information that is written to it. Similarly, the processor 902 may comprise an internal RAM, an internal ROM, a cache memory, and/or other internal non-transitory storage blocks, sections, or components that may be referred to in some contexts as non-transitory computer readable media or computer readable storage media.

In an alternative embodiment the system may be implemented in an application specific integrated circuit ("ASIC") comprising logic configured to perform any action described in this disclosure with corresponding and appropriate inputs and outputs or a digital signal processor ("DSP").

In accordance with at least some embodiments, the disclosed error recovery operations are implemented on a semiconductor chip having hardware accelerator components. For example, the hardware accelerator components may include a video encoder/decoder component with a pipeline and with error recovery logic (e.g., error recovery controller 108 of FIG. 1), wherein the error recovery logic is configured to perform pipe-down operations to clear the pipeline without interrupting ongoing tasks. The error recovery logic also may stall end of task signaling, wait for a predetermined number of data blocks to come out of the pipeline, and wait for a predetermined number of load activations for the video encoder/decoder component. Further, the error recovery logic may load null operations (NOPs) to the video encoder/decoder component, release the end of task signaling, and perform pipe-up operations to restart the pipeline at a next synchronization point.

In some embodiments, error recovery logic of a video encoder/decoder component on a semiconductor chip also may change an AMR of a first sequencer responsible for a task preceding an asynchronous error in the pipeline, and change an AMR of a second sequencer responsible for a task succeeding the asynchronous error in the pipeline. Error recovery logic of a video encoder/decoder component on a semiconductor chip also may load NOPs and end commands into an auxiliary buffer of the video encoder/decoder component, and change video encoder/decoder component commands into NOPs and end commands. Error recovery logic of a video encoder/decoder component on a semiconductor chip also may release the end of task signaling after loading the NOPs load and changing the AMRs. The release of the end of task signaling enables pipeline operations up to a store operation associated with a final stage of the pipeline to complete before a pipeline restart is performed.

In some embodiments, error recovery logic of a video encoder/decoder component on a semiconductor chip also may perform pipe-up operations to search for a next synchronization point, and to decode a slice header. The error recovery logic of a video encoder/decoder component on a semiconductor chip also may perform pipe-up operations to update a set of software counters to point to a new macroblock number, and to update registers of the video encoder/decoder component to resume decoding from a new slice. The error recovery logic of a video encoder/decoder component on a semiconductor chip also may perform pipe-up operations to update load/store engine counters of the video encoder/decoder component, to update video direct memory access (vDMA) descriptors, and to correct AMRs of a first sequencer and a second sequencer of the video encoder/decoder component. Further, error recovery logic of a video encoder/decoder component on a semiconductor chip also may perform pipe-up operations to send fake messages to cause a loop filter engine of the video encoder/decoder component to point to a correct macoblock after a pipeline restart is initiated.

Figure 10:
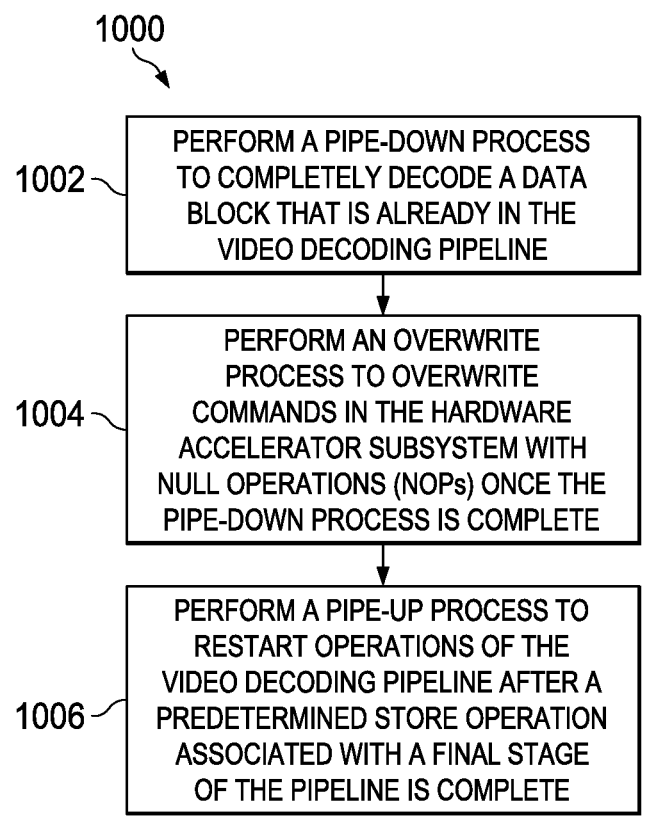
FIG. 10 illustrates a method in accordance with various embodiments.

FIG. 10 illustrates a method 1000 in accordance with various embodiments. The method 1000 may be for error recovery in a hardware accelerator subsystem with a video decoding pipeline. As shown, the method 1000 comprises performing a pipe-down process to completely decode a data block that is already in the video decoding pipeline (block 1002). At block 1004, an overwrite process is performed to overwrite commands in the hardware accelerator subsystem with NOPs once the pipe-down process is complete. Finally, a pipe-up process is performed to restart operations of the video decoding pipeline after a predetermined store operation associated with a final stage of the pipeline is complete (block 1006).

In at least some embodiments, the method 1000 may comprise additional or alternative steps. For example, the method 1000 may additionally comprise storing the commands in a memory internal to the hardware accelerator subsystem. Further, the method 1000 may additionally comprise stalling end of task signaling and continuing pipeline operations for all data blocks for which activations are received while the end of task signaling is stalled. Further, the method 1000 may additionally comprise directly overwriting ping state commands of the hardware accelerator subsystem with NOPs. Further, the method 1000 may additionally comprise overwriting pong state commands of the hardware accelerator subsystem by loading the NOPs to an auxiliary buffer of the hardware accelerator subsystem. Further, the method 1000 may additionally comprise storing a flag in a shared memory to enable loading of said NOPs after the pipe-down process is complete.

The above disclosure is meant to be illustrative of the principles and various embodiment of the invention. Numerous variations and modifications will become apparent to those skilled in the art once the above disclosure is fully appreciated. It is intended that the following claims be interpreted to embrace all variations and modifications.

What is claimed is:

1. An apparatus comprising:
a hardware accelerator subsystem with a pipeline, wherein the hardware accelerator subsystem is configured to perform error recovery operations in response to a bit stream error,
wherein the error recovery operations comprise a pipe-down process to completely decode a data block that is already in the pipeline, an overwrite process to overwrite commands in the hardware accelerator subsystem with null operations (NOPs) once the pipe-down process is complete, and a pipe-up process to restart decoding operations of the pipeline at a next synchronization point, and wherein, during the overwrite process, ping state commands of the hardware accelerator subsystem are directly overwritten with NOPs by a sequencer component.

2. The apparatus of claim 1, wherein the hardware accelerator subsystem comprises a video decoder engine and wherein the data block comprises a macroblock.

3. The apparatus of claim 1, wherein the commands are stored in a memory internal to the hardware accelerator subsystem.

4. The apparatus of claim 1, wherein the hardware accelerator subsystem comprises an entropy coder/decoder engine that, during the pipe-down process, is configured to stall end of task signaling and to continue pipeline operations for all data blocks for which activations are received while the end of task signaling is stalled.

5. The apparatus of claim 1, wherein the hardware accelerator subsystem comprises a shared memory that stores a flag to initiate loading of said NOPs after the pipe-down process is complete.

6. An apparatus comprising:
a hardware accelerator subsystem with a pipeline, wherein the hardware accelerator subsystem is configured to perform error recovery operations in response to a bit stream error, wherein the error recovery operations comprise a pipe-down process to completely decode a data block that is already in the pipeline, an overwrite process to overwrite commands in the hardware accelerator subsystem with null operations (NOPs) once the pipe-down process is complete, and a pipe-up process to restart decoding operations of the pipeline at a next synchronization point, and wherein, during the overwrite process, pong state commands of the hardware accelerator subsystem are overwritten by a load/store engine that loads the NOPs to an auxiliary buffer of the hardware accelerator subsystem.

7. A semiconductor chip comprising:
a hardware accelerator having a video encoder/decoder component with a pipeline and with error recovery logic, wherein the error recovery logic is configured to:
perform pipe-down operations to clear the pipeline without interrupting ongoing tasks;
stall end of task signaling;
wait for a predetermined number of data blocks to come out of the pipeline and for a predetermined number of load activations for the video encoder/decoder component;
load null operations (NOPs) to the video encoder/decoder component;
release the end of task signaling; and
perform pipe-up operations to restart the pipeline at a next synchronization point, wherein the pipe-up operations cause the error recovery logic of the video encoder/decoder component to:
update load/store engine counters of the video encoder/decoder component;
update video direct memory access (vDMA) descriptors; and
correct an address mapped register of a first sequencer and a second sequencer of the video encoder/decoder component.

8. The semiconductor chip of claim 7, wherein the error recovery logic of the video encoder/decoder component is further configured to:
change an address mapped register of a first sequencer responsible for a task preceding an asynchronous error in the pipeline; and
change an address mapped register of a second sequencer responsible for a task succeeding the asynchronous error in the pipeline.

9. The semiconductor chip of claim 7, wherein the error recovery logic of the video encoder/decoder component is further configured to:
load NOPs and end commands into an auxiliary buffer of the video encoder/decoder component; and
change video encoder/decoder component commands into NOPs and end commands.

10. The semiconductor chip of claim 9, wherein the error recovery logic of the video encoder/decoder component is configured to unstall the end of task signaling after said load and said change, and to wait for a store operation associated with a final stage of the pipeline to complete before said restart is performed.

11. The semiconductor chip of claim 7, wherein the pipe-up operations cause the error recovery logic of the video encoder/decoder component to:
search for the synchronization point;
decode a slice header;
update a set of software counters to point to a new macroblock number; and
update registers of the video encoder/decoder component to resume decoding from a new slice.

12. The semiconductor chip of claim 7, wherein the pipe-up operations cause the error recovery logic of the video encoder/decoder component to send fake messages to cause a loop filter engine of the video encoder/decoder component to point to a correct macroblock after said restart.

13. A method for error recovery in a hardware accelerator subsystem with a video decoding pipeline, the method comprising:
performing a pipe-down process to completely decode a data block that is already in the video decoding pipeline;
performing an overwrite process to overwrite commands in the hardware accelerator subsystem with null operations (NOPs) once the pipe-down process is complete including directly overwriting ping state commands of the hardware accelerator subsystem with NOPs by a sequencer component; and
performing a pipe-up process to restart operations of the video decoding pipeline after a predetermined store operation associated with a final stage of the pipeline is complete.

14. The method of claim 13 further comprising storing the commands in a memory internal to the hardware accelerator subsystem.

15. The method of claim 13 further comprising stalling end of task signaling and continuing pipeline operations for all data blocks for which activations are received while the end of task signaling is stalled.

16. A method for error recovery in a hardware accelerator subsystem with a video decoding pipeline, the method comprising:
performing a pipe-down process to completely decode a data block that is already in the video decoding pipeline;
performing an overwrite process to overwrite commands in the hardware accelerator subsystem with null operations (NOPs) once the pipe-down process is complete including overwriting pong state commands of the hardware accelerator subsystem by loading the NOPs to an auxiliary buffer of the hardware accelerator subsystem; and
performing a pipe-up process to restart operations of the video decoding pipeline after a predetermined store operation associated with a final stage of the pipeline is complete.

17. The method of claim 13 further comprising storing a flag in a shared memory to enable loading of said NOPs after the pipe-down process is complete.

* * * * *